United States Patent [19]

Fukuoka

[11] 4,257,044
[45] Mar. 17, 1981

[54] GRAPHIC DISPLAY SYSTEM FOR RASTER SCANNING INVOLVING WOBBLING

[75] Inventor: Kenji Fukuoka, Fussa, Japan

[73] Assignee: Olympus Optical Co. Ltd., Tokyo, Japan

[21] Appl. No.: 86,069

[22] Filed: Oct. 18, 1979

Related U.S. Application Data

[63] Continuation of Ser. No. 855,432, Nov. 28, 1977, abandoned.

[30] Foreign Application Priority Data

Nov. 29, 1976 [JP] Japan .................................. 51-142144

[51] Int. Cl.$^3$ ................................................ G06F 3/14
[52] U.S. Cl. ................................... 340/731; 340/744; 340/723; 358/280; 364/515
[58] Field of Search ................ 340/728, 731, 748, 749, 340/744, 724, 723; 358/280; 364/515

[56] References Cited

U.S. PATENT DOCUMENTS

| | | | |
|---|---|---|---|
| 3,426,344 | 2/1969 | Clark | 340/748 |
| 3,471,848 | 10/1969 | Manber | 340/748 |
| 3,878,536 | 4/1975 | Gilliam | 340/728 |
| 3,969,716 | 7/1976 | Roberts | 340/728 |
| 4,090,188 | 5/1978 | Suga | 340/731 |
| 4,115,804 | 9/1978 | Morton et al. | 364/515 |
| 4,129,860 | 12/1978 | Yonezawa et al. | 340/731 |

*Primary Examiner*—Marshall M. Curtis
*Attorney, Agent, or Firm*—Haseltine and Lake

[57] ABSTRACT

A graphic display system which is particularly applicable to a raster scanning type graphic display device is disclosed. The system extracts a given partial pattern from an original pattern by comparing a counted value of an input coordinate X axis counter for counting the number of picture elements of the original pattern with given preset values so as to select a picture element having an X coordinate value within a given range of input coordinates and by comparing a counted value of an input coordinate Y axis counter for counting the number of scanning lines of the original pattern with given preset values so as to select a picture element having a Y coordinate value within the given range of the input coordinates. The given values are preset to a display coordinate X axis counter and a display coordinate Y axis counter, respectively, so as to bring a leading picture element of the partial pattern extracted from the original pattern into correspondence with the given coordinates of the display coordinates. The contents of the display coordinate X axis counter are subjected to increment so as to determine a coordinate position of a picture element to be recorded next to a recorded picture element in correspondence with recording and display of each picture element and resetting the display coordinate X axis counter and subjecting contents of the display Y axis counter to increment when the contents of the display coordinate X axis counter exceed the given preset values. The recording and display is stopped when the contents of both display coordinate X axis counter and the display coordinate Y axis counter reach respective given preset values so as to control the recording of the partial pattern.

7 Claims, 10 Drawing Figures

GRAPHIC DISPLAY SYSTEM FOR RASTER SCANNING INVOLVING WOBBLING

This is a continuation of application Ser. No. 855,432 filed Nov. 28, 1977 now abandoned.

BACKGROUND OF THE INVENTION (1) Field of the Invention

This invention relates to a graphic display system which is applicable to a cathode ray display device, various kinds of printers such as an ink-jet printer, etc. and a facsimile recording device.

(2) Description of the Prior Art

Various types of graphic display devices have been proposed, but hitherto none has led to fully satisfactory results. A raster scanning type graphic display device, for example, functions to display an input signal pattern only. Such simple function makes the device significantly inconvenient. That is, in such conventional graphic display device, in the case of observing the pattern in a micro picture element level, the pattern has been enlarged with the aid of lenses, and as a result, one could only observe faded scanning lines. Such device, therefore, is not fully sufficient to the industry.

SUMMARY OF THE INVENTION

An object of the invention, therefore, is to provide a graphic display system which is particularly applicable to a raster scanning type graphic display device and which can display any desired partial pattern of an input pattern on any desired part of a display surface.

A feature of the invention is the provision of a graphic display system with a device for extracting a given partial pattern from an original pattern by comparing a counted value of an input coordinate X axis counter for counting the number of picture elements of the original pattern with given preset values so as to select a picture element having an X coordinate value within a given range of input coordinate and by comparing a counted value of an input coordinate Y axis counter for counting the number of scanning lines of the original pattern with given preset values so as to select a picture element having a Y coordinate value within the given range of the input coordinates.

It also has a device for presetting given values to a display coordinate X axis counter and a display coordinate Y axis counter, respectively, so as to bring a leading picture element of the partial pattern extracted from the original pattern into correspondence with given coordinates of display coordinates.

Another device is subjecting the contents of the display coordinate X axis counter to increment so as to determine a coordinate position of a picture element to be recorded next to a recorded picture element in correspondence with recording and display of each picture element and resetting the display coordinate X axis counter and subjecting contents of the display Y axis counter to increment when the contents of the display coordinate X axis counter exceed said given preset values; recording and display is stopped when the contents of both the display coordinate X axis counter and the display coordinate Y axis counter reach to respective given preset values so as to control the recording of the partial pattern.

The invention will now be described in greater detail with reference to the accompanying drawings.

DESCRIPTION OF THE PREFERRED EMBODIMENTS

Figure 1:
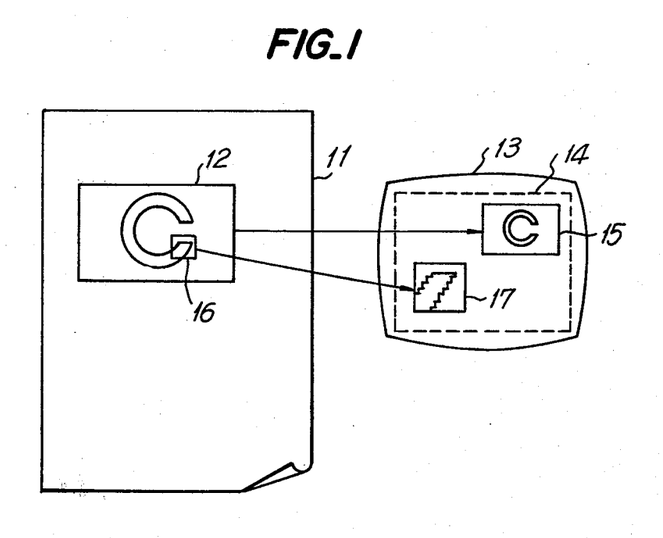
FIG. 1 is a diagram illustrating a display mode of a graphic display system according to the invention.

In FIG. 1 is diagrammatically shown a display mode of a graphic display system according to the invention. The graphic display system according to the invention comprises extracting a partial pattern 12 from an input pattern information 11 and recording and displaying the partial pattern 12 at any desired place 15 on a display surface 14 of a display device 13 or recording and displaying a partial pattern 16 in an enlarged scale at any desired place 17 on the display surface 14 with different magnifications.

Figure 2:
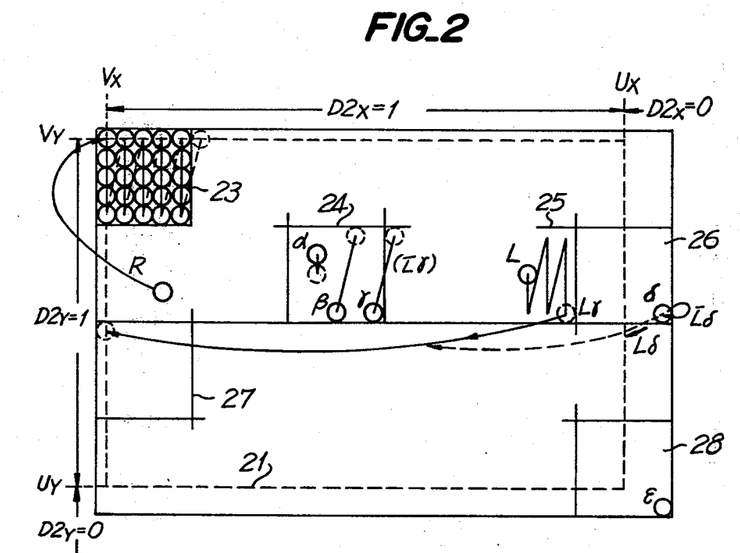
FIG. 2 is a diagram illustrating a principle of recording and displaying a partial pattern with certain magnification according to the invention.

In FIG. 2 is diagrammatically illustrated a principle of recording and displaying a partial pattern with certain magnification. Let it be assumed that an original point (not shown) of coordinates is located at upper left side of FIG. 2. In addition, let it be assumed that units of an X axis are increased from left to right and that units of a Y axis are increased from top to bottom. A display range 21 shown by dotted lines on the display surface is defined by preset values $U_X$, $V_X$, $U_Y$ and $V_Y$. A raster scanning consists of a main scanning effected in parallel with the X axis from left to right and an auxiliary scanning effected in parallel with the Y axis from top to bottom. In order to magnify a display pattern, the raster scanning is effected in combination with a wobbling scanning as shown by arrows in square picture element 23, 24, 25, 26, 27 and 28 each composed of a number of spots each shown by a circle. In FIG. 2, 5×5 spots represent one picture element. As a result, it is possible to change a size of the pattern or a magnification thereof by changing the number of spots representing one picture element.

The graphic display system according to the invention will now be described in greater detail with reference not only to display coordinates on the display surface but also to picture element coordinates. The picture element coordinates comprise an original point located at a spot at the upper left of a picture element, an X axis including units increasing from left to right and a Y axis including units increasing from top to bottom.

Figure 3:
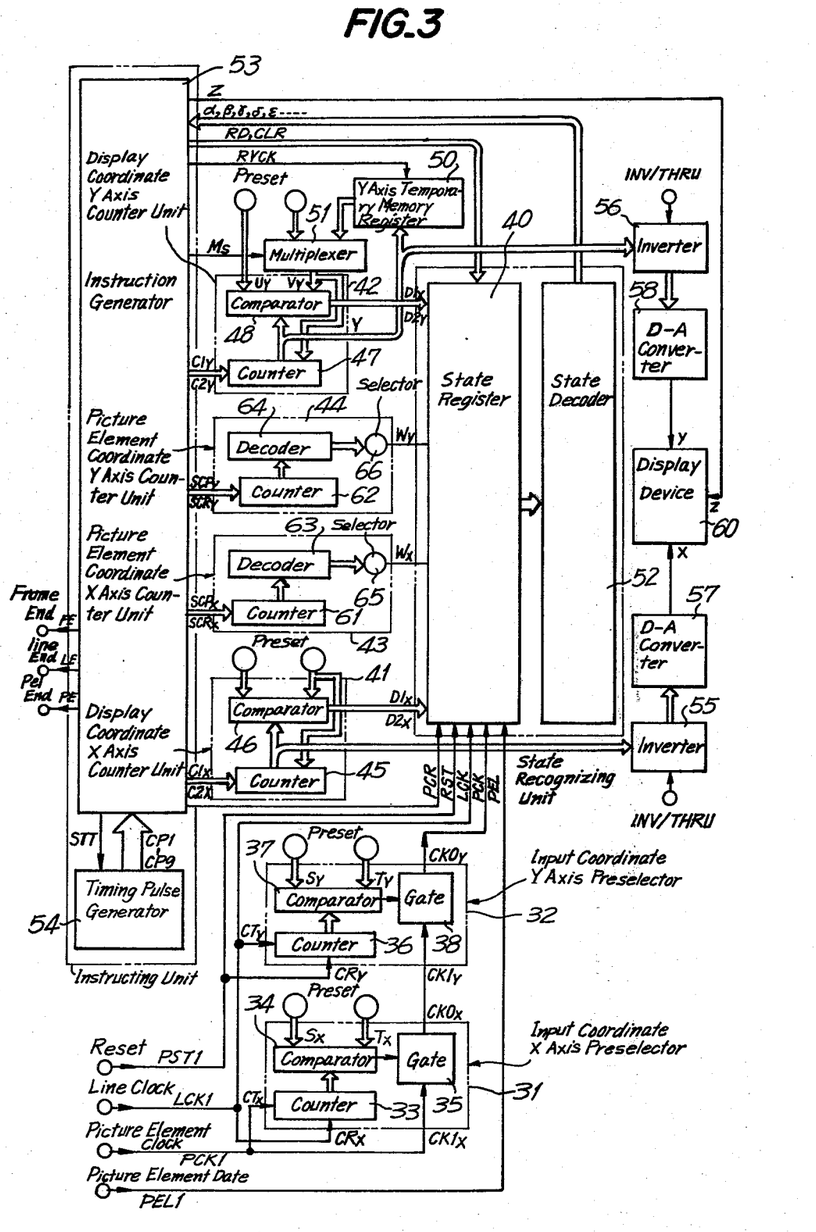
FIG. 3 is a block diagram of an electrical circuit for practicing a graphic display system according to the invention.

In FIG. 3 is a block diagram of an electrical circuit that may be employed to practice the graphic display system according to the invention. In the present embodiment, input signals delivered from the outside consist of a picture element data PELI, a picture element clock PCKI following the picture element data, a line clock LCKI given to every leading or final scanning line and a reset RSTI.

The input pattern information is given by the picture element data PELI, picture element clock PCKI and line clock LCKI. A desired partial pattern is extracted from the original pattern by means of an input coordinate X axis preselector 31 and input coordinate Y axis preselector 32. As seen from FIG. 3, both the input coordinate X axis preselector 31 and input coordinate Y axis preselector 32 are the same in construction and composed of counters 33, 36, comparators 34, 37 and gates 35, 38, respectively.

Figure 4:
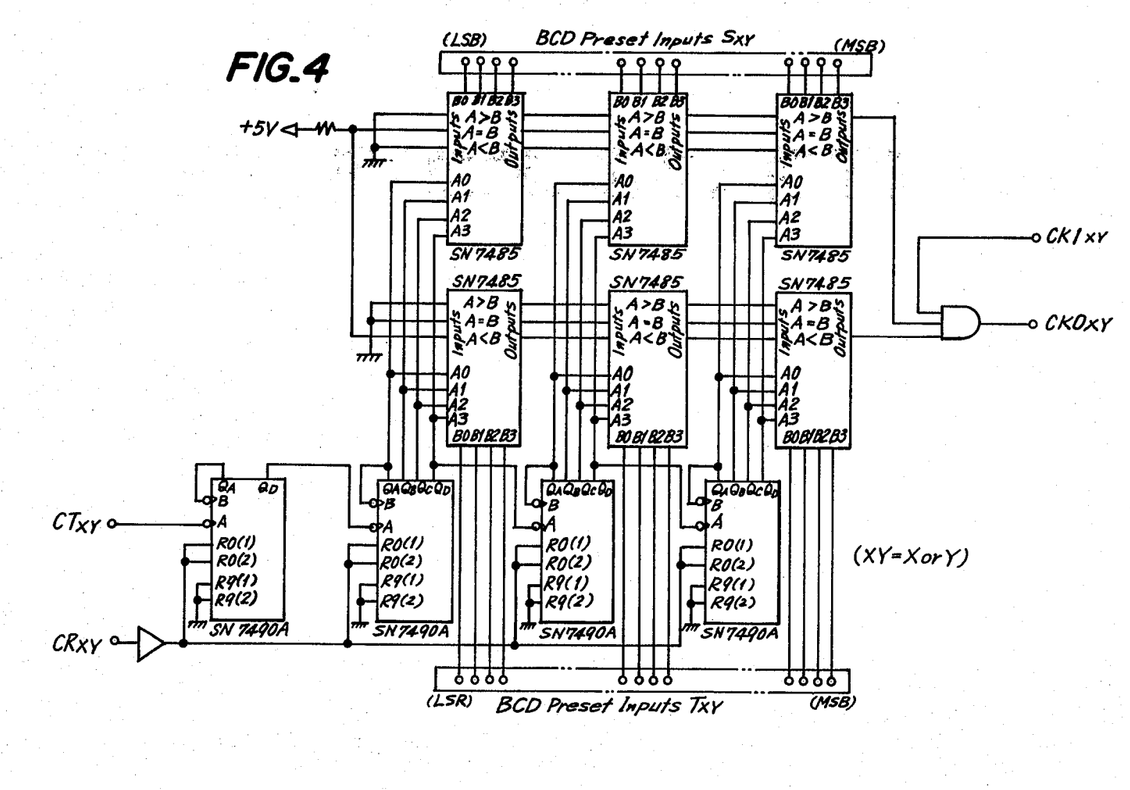
FIG. 4 is a detailed illustration of an electrical circuit that may be employed to practice an input coordinate X axis preselector and input coordinate Y axis preselector shown in FIG. 3.

In FIG. 4 is shown a detailed illustration of an electrical circuit that may be employed to practice the input coordinate X axis preselector 31 and the input coordinate Y axis preselector 32.

In the embodiment shown in FIG. 3, at first, the X axis counter 33 is cleared by the line clock LCKI and the Y axis counter 36 is cleared by the reset RSTI. The X axis counter 33 functions to count the number of the picture element clocks PCKI and the value thus counted is compared with preset values $S_X$ and $T_X$ by means of the comparator 34. If the counted value lies between the preset values $S_X$ and $T_X$, the gate 35 becomes opened to cause the picture element clock PCKI to pass the gate 35. If the scanning line is changed, the line clock LCKI functions to clear the X axis counter 33. Then, the X axis preselector 31 will repeat the above mentioned successive operations so as to select that picture element clock PCKI which has an X coordinate value within a range defined by the preset values $S_X$, $T_X$ at every scanning line and hence to select a picture element.

The line clock LCKI produced at every scanning line is counted by the Y axis counter 36 and the value thus counted is compared with preset values $S_Y$ and $T_Y$ by means of the comparator 37. If the counted value lies between the preset values $S_Y$ and $T_Y$, the gate 38 becomes opened to cause the picture element clock PCKI to pass the gate 38. The picture element clock PCKI passes through both the gates 35, 38, and as a result, that picture element clock PCKI only which corresponds to a given partial pattern is selected.

Those parts of the electrical circuit shown in FIG. 3 which function to record and display the partial pattern extracted from an original pattern as above described will now be described. The input signals consisting of the picture element clock PCKI which has been selected by the input coordinate X axis preselector 31 and input coordinate Y axis preselector 32, picture element data PELI, line clock LCKI and reset RSTI are supplied as PCK, PEL, LCK and RST to a state register 40. The state register 40 functions to store not only the above mentioned input signals but also store signals $D1_X$, $D2_X$ delivered from a display coordinate X axis counter unit 41, signals $D1_Y$, $D2_Y$ delivered from a display coordinate Y axis counter unit 42, a signal $W_X$ delivered from a picture element coordinate X axis counter unit 43 and a signal $W_Y$ delivered from a picture element coordinate Y axis counter unit 44. The signals $D1_X$, $D2_X$, $D1_Y$, $D2_Y$, $W_X$ and $W_Y$ functions to determine the position of the spot on the display surface. As seen from FIG. 3, both the display X axis counter unit 41 and the display Y axis counter unit 42 are the same in construction and composed of counters 45, 47 and comparators 46, 48, respectively.

In order to define a range to be displayed on the display surface, the content of the display coordinate X axis counter 45 is compared with the preset values $U_X$ and $V_X$ by means of the comparator 46. The outputs $D1_X$ and $D2_X$ from the comparator 46 are stored in the state register 40. Similarly, the content of the display coordinate Y axis counter 47 is compared with preset values $U_X$ and $V_Y$ by means of the comparator 48. The outputs $D1_Y$ and $D2_Y$ are stored in the state register 40.

Figure 5:
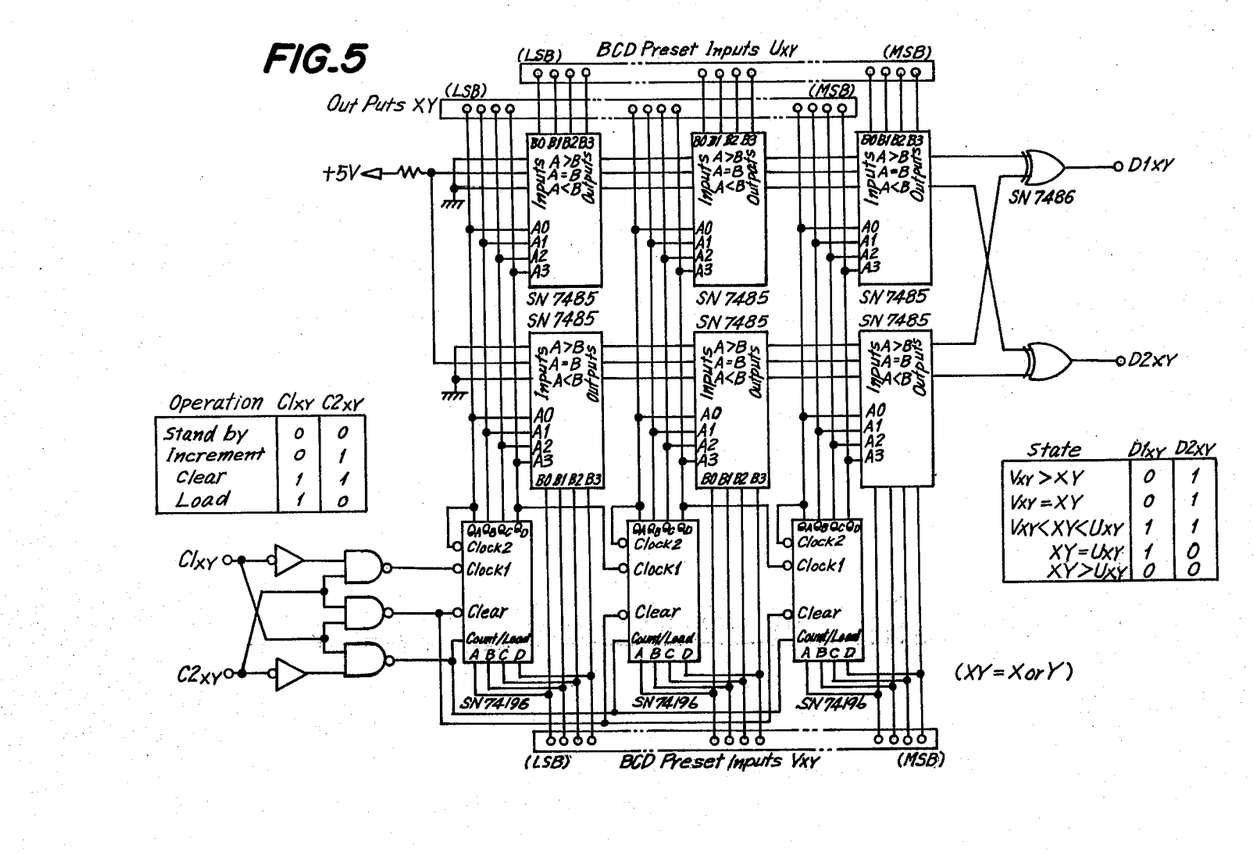
FIG. 5 is a detailed illustration of an electrical circuit that may be employed to practice a display coordinate X axis counter unit and display coordinate Y axis counter unit shown in FIG. 3.

In FIG. 5 is shown a detailed illustration of an electrical circuit that may be employed to practice the display coordinate X axis counter unit 41 and the display coordinate Y axis counter unit 42. In the electrical circuit shown in FIG. 5, in order to reduce the number of pins of input and output connectors, the input signals $C1_{XY}$, $C2_{XY}$ and output signals $D1_{XY}$, $D2_{XY}$ are coded into binary coded decimal notation which functions as shown by the annexed Tables in FIG. 5. When both the input signals $C1_{XY}$ and $C2_{XY}$ are "0", both the display coordinate X and Y axis counter units 41, 42 become inoperative as designated by STAND BY in the Table in FIG. 5. If $C1_{XY}$ only become "1", binary coded decimal preset values $V_{XY}$ are preset to the counters 45, 47. If $C2_{XY}$ only become "1", the counters 45, 47 function to increase contents thereof by 1 as designated by INCREMENT in the Table in FIG. 5. If both $C1_{XY}$ and $C2_{XY}$ become "1" at the completely same time and then are returned to "0" at the completely same time, the counters 45, 47 are cleared as designated by CLEAR in the Table of FIG. 5.

If the output signals $D1_{XY}$ are given by $$V_{XY} < D1_{XY} \leq U_{XY},$$

the output signals $D1_{XY}$ become "1". If the output signals $D1_{XY}$ are given by $$D1_{XY} < V_{XY}$$

$$D1_{XY} > U_{XY},$$

the output signals $D1_{XY}$ become "0". If the output signals $D2_{XY}$ are given by $$V_{XY} \leq D2_{XY} < U_{XY},$$

the output signals $D2_{XY}$ become "1". If the output signals $D2_{XY}$ are given by $$D2_{XY} < V_{XY}$$

$$D2_{XY} \geq U_{XY},$$

the output signals $D2_{XY}$ become "0".

As shown in FIG. 3, provision is made of a Y axis temporary memory register 50 which functions to temporarily store the Y coordinate value of the display coordinates in the case of effecting the wobbling scanning. The Y axis temporary memory register 50 is connected so as to read the content of the display coordinate Y axis counter 47. The output from the Y axis temporary memory register 50 is supplied through a multiplexer 51 to that terminal of the comparator 48 which receives the preset value $V_Y$. As a result, it is possible to set the content stored in the Y axis temporary memory register 50 to the Y axis counter 47.

Figure 6:
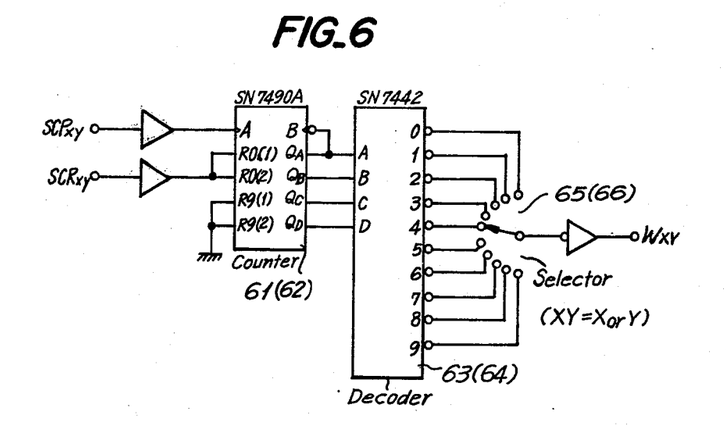
FIG. 6 is a detailed illustration of an electrical circuit that may be employed to practice a picture element coordinate X axis counter unit and picture element coordinate Y axis counter unit shown in FIG. 3.

In FIG. 6 is shown a detailed illustration of an electrical circuit that may be employed to practice the picture element coordinate X axis counter unit 43 and picture element coordinate Y axis counter unit 44 shown in FIG. 3. As seen from FIG. 3, both the picture element X axis counter unit 43 and the picture element Y axis counter unit 44 are the same in construction and composed of counters 61, 62, decoders 63, 64 and selectors 65, 66, respectively. The counters 61, 62 are cleared by input signals $SCR_{XY}$ and subjected to increment by input signals $SCP_{XY}$. The contents of the counters 61, 62 are interpreted by the decoders 63, 64. Outputs from the decoders 63, 64 are selected to outputs $W_{XY}$ by means of the selectors 65, 66. The outputs $W_{XY}$ become "1" when the contents of the counters 61, 62 are given by values determined by the selectors 65, 66.

The date relating to the state and stored in the state register 40 is interpreted by a state decoder 52. The state decoder 52 functions to provide various kinds of states. The state register 40 and the state decoder 52 constitute a state recognizing unit. Provision is made of an instruction generator 53 which functions to deliver instruction pulses to various parts shown in FIG. 3 in response to the kinds of state. The timing of generating the instruction pulses is determined by pulses delivered from a timing pulse generator 54. The instruction generator 55 also functions to deliver a brightness modulating signal Z in response to the kind of state. The brightness modulating signal Z functions to record the light and darkness of the picture element.

A series of operations mainly associated with the instruction generator 53 will hereinafter be described in greater detail with reference to an electrical circuit that may be employed to practice the instruction generator 53.

The counted outputs from the display coordinate X axis counter 45 and Y axis counter 47 are supplied to inverters 55, 56, respectively. The inverters 55, 56 function not only to deliver its control input INV/THRU but also to deliver an output complementary to the control input INV/THRU. As shown in FIG. 5, if the display coordinate X axis counter 45 and Y axis counter 47 are composed of the binary coded decimal counters, the inverters 55, 56 must deliver an output complementary to 9 of each digit of the binary coded decimal digits.

Figure 7:
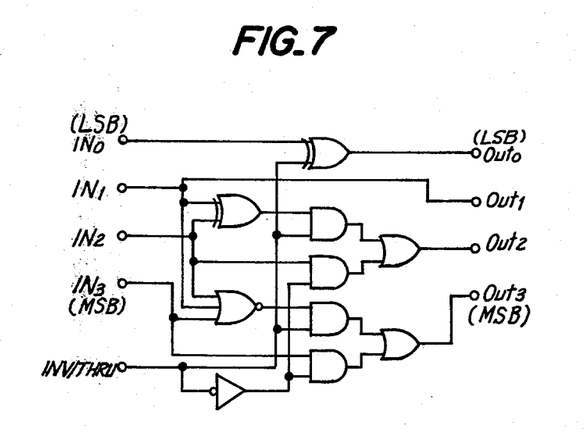
FIG. 7 is a detailed illustration of an electrical circuit that may be employed to practice an inverter shown in FIG. 3 and delivering an output associated with 1 digit of binary coded decimal digits.

In FIG. 7 is shown an electrical circuit that may be employed to practice the inverters 55, 56 which deliver an output associated with 1 digit of binary coded decimal digits. The inverters 55, 56 can freely select positive and negative directions in X and Y axes of the display coordinates.

The outputs delivered from the inverters 55, 56 and relating to the X and Y axes are converted into analog voltage outputs x, y by means of D-A converters 57, 58, respectively.

Figure 8:
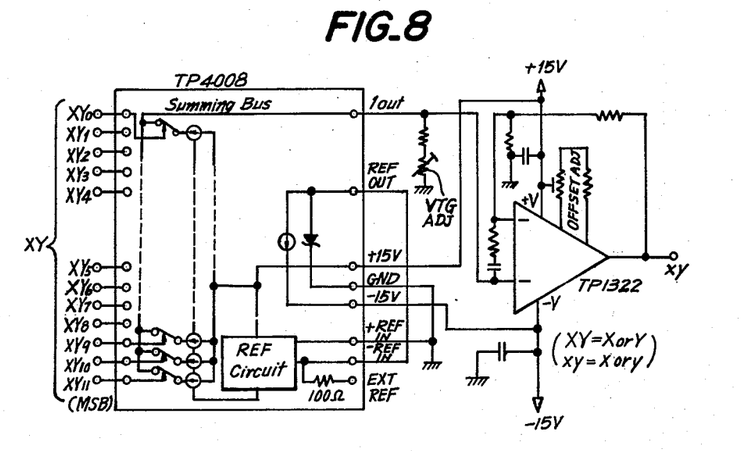
FIG. 8 is a detailed illustration of an electrical circuit that may be employed to practice a D-A converter shown in FIG. 3.

In FIG. 8 is shown an electrical circuit that may be employed to practice the D-A converters 57, 58. TP 4008 designates a current output time converter element and TP 1322 functions as a buffer.

In FIG. 3, to X axis, Y axis and Z axis of a display device 60 are supplied the outputs x, y from the D-A converters 57, 58 and the brightness modulating output Z from the instruction generator 53 so as to reproduce a given pattern. As the display device 60, use may be made of a storage type cathode ray tube for obtaining a soft copy or an ink jet printer for obtaining a hard copy.

Figure 9:
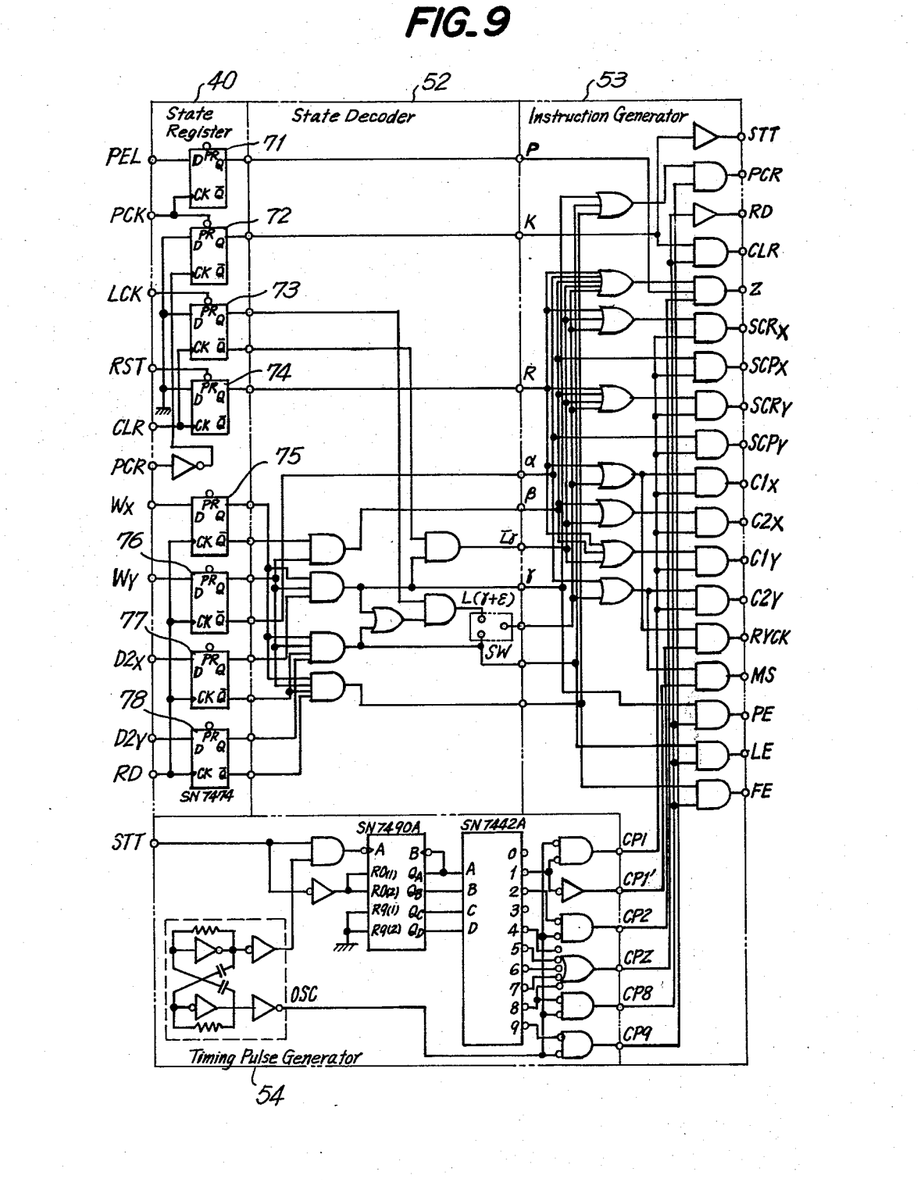
FIG. 9 is a detailed illustration of an electrical circuit that may be employed to practice a state register, state decoder, instruction generator and timing pulse generator shown in FIG. 3.

In FIG. 9 is shown an electrical circuit that may be employed to practice the state register 40, state decoder 52, timing pulse generator 54 and instruction generator 53.

In the state register 40, the picture signal PEL is read in a D type flipflop 71 with the aid of the picture element clock PCK. The picture element clock PCI, line clock LCK and reset RST function to set D type flipflops 72, 73 and 74 in an asynchronous manner, respectively, these flipflops being cleared by the clear pulse CLR. The putputs $W_X$, $W_Y$ delivered from the picture element coordinate X axis counter unit 43, Y axis counter unit 44 and the outputs $D2_X$, $D2_Y$ delivered from the display coordinate X axis counter unit 41, Y axis counter unit 42 are read in D type flipflops 75, 76, 77, 78 with the aid of a read in pulse RD, respectively.

The data states read in the state register 40 consist of a light and dark state P obtained by the picture element data PEL, a state K in which the picture element data PEL is read in the state register 40, a state R for requesting the reset RST, a state $\alpha$ in which the next spot is adjacent to the original spot in Y direction as shown in FIG. 2, a state $\beta$ in which the spot is to be flied back in the wobbling scanning, a state $\gamma$ in which the spot is to be flied back in the wobbling scanning and located at the final spot, a state $\delta$ in which the spot is located at the final spot in the final picture element 26 of the scanning line in the X axis direction preset, and a state $\epsilon$ in which the spot is located at the final spot in the final picture element 28 of the frame 21 preset. The states $\gamma$, $\delta$ are classified into $\overline{L}\gamma$, $L\gamma$; $\overline{L}\delta$, $L\delta$ with the aid of the arrival state L of the line clock LCK. The state L is associated with the case in which the flyback line of the main scanning in the X axis direction is made synchronous with the line clock LCK. That is, $\overline{L}\gamma$ is a state in which the wobbling scanning is to be flied back, $L\gamma$ is a state in which the spot is set to the state L and then records the picture element up to the final spot and subsequently the main scanning is flied back, $L\delta$ is a state in which the picture element being recorded is the final picture element of the scanning line preset and $\overline{L}\delta$ is a state in which the spot is located at the state $\delta$ and held at the state $\delta$ owing to the non-arrival of the line clock LCK.

Various kinds of states described above with reference to FIG. 2 are interpreted by means of the state decoder 52 shown in FIG. 9. In FIG. 9, SW designates a switch for selecting the state in which the main scanning is flied back in synchronism with the line clock LCK or the state in which the main scanning is flied back in asynchronism with the line clock LCK. In the state shown in FIG. 9, the main scanning is flied back in synchronism with the line clock LCK. In FIG. 9, $L(\gamma+\delta)$ designates the state in which the main scanning must be flied back.

In the annexed Table is illustrated the logical construction of the state decoder 52. The contents of each state of the state register 40 shown in the upper part of the Table are given by logical product. In the Table, symbol x designates "don't care" that is not used for obtaining the logical product. The state β, for example, is given by a state in which $W_X$ is "0" and $W_Y$ is "1". As a result, the state β can be obtained by one AND gate as shown in FIG. 9.

The instruction generator 53 functions to deliver instruction pulses to various circuit elements shown in FIG. 3 such that the spot is transferred as shown in FIG. 2 in response to various kinds of states obtained by the way as described above.

In FIG. 9 is also shown an electrical circuit that may be employed to practice the instruction generator 53 and an electrical circuit that may be employed to practice the timing pulse generator 54 which functions to define the timing of generating the instructions. The logical operation of the instruction generator 53 and timing pulse generator 54 is also shown in the annexed Table. The timing pulse generator 54 generates polyphase pulses.

Figure 10:
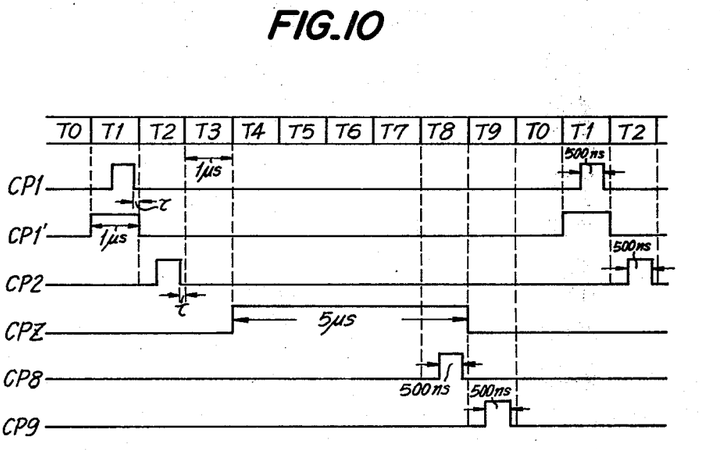
FIG. 10 is a diagram showing a time chart of output pulses delivered from a timing pulse generator shown in FIGS. 3 and 9.

In FIG. 10 are shown outputs pulses CP1, CP1', CP2, CPZ, CP8 and CP9 delivered from the timing pulse generator 54 in th order as mentioned. The output pulse CP1 gives timing of effecting CLEAR, LOAD, INCREMENT, etc. of each coordinate axis counter as shown by the symbols · in the annexed Table, the output pulse CP1' gives timing of changing over the multiplexer 51 shown in FIG. 3 as shown by the symbol · in the annexed Table, the output pulse CP2 gives timing of reading the memory data in the Y axis temporary memory register 50 shown in FIG. 3 as shown by the symbol · in the annexed Table, the output pulse CPZ gives timing of writing the spot in the display surface of the display device 60 shown in FIG. 3 as shown by the symbol · in the annexed Table, the output pulse CP8 gives timing of clearing the state register 40 shown in FIG. 3 as shown by the symbol · in the annexed Table and gives also timing of delivering end signal outputs of FRAME END (FE), LINE END (LE), PEL END (PE) as shown by the symbols · in the annexed Table and the output pulse CP9 gives timing of clearing the state register 40 shown in FIG. 3 as shown by symbol · in the annexed Table.

In FIG. 10, a representative value of the width of time state T0, T1, ..., T9 is 1 μsec. Each of the output pulses CP1, CP2, CP8 and CP9 has a width of 500 nsec. The output pulse CP1' has a width of 1 μsec and the output pulse CPZ has a width of 5 μsec. The output pulse CP1 lies within the pulse width of the output pulse CP1'. A time τ corresponds to a delay time from the output pulse delivered from an oscillator OSC shown in FIG. 9 to the output pulse delivered from the AND gates, BCD counters and BCD decoder.

The instruction pulses delivered from the instruction generator 53 will now be described with reference to the annexed Table and FIG. 9.

In the input state K, a start instruction pulse STT supplied to the timing pulse generator 54 is equal to the picture element clock PCK as shown by the symbol "=" in the annexed Table. The start instruction pulse STT causes an AND gate provided in the timing pulse generator 54 to open so as to start the counting operation of a BCD counter, thereby generating timing pulse outputs CP1 to CP9 each corresponding to each time slot. These timing pulses are stopped at every time one picture element is recorded, that is, are stopped at the states γ, δ and ε. One cycle from CP1 to CP9 of the timing pulse corresponds to one spot. In the states γ, δ and ε, that is, at the end CP9 of the cycle, the state K in which the picture element data PEL is read in the state register 40 is cleared with the aid of the clear instruction PCR to make the start instruction STT "0", so that the timing pulse generator 54 becomes stopped.

The instruction pulse read in the state register 40 is CP8 itself. That is, the reading in operation of every spot is effected at the end of the cycle. The instruction pulse CLR for clearing the states R and L each asynchronously set is delivered with the aid of CP8 when the first spot of the picture element reaches to the end of its cycle. The cycle of the first spot begins from the start instruction STT, that is, from the state K. As a result, the instruction pulse CLR is given by AND of K and CP8. After the clear instruction has been delivered, the spot is not recorded by the input instructions supplied from the outside, that is, by the reset RST, line clock LCK and picture element clock PCK, but the spot is automatically recorded successively in accordance with the state α, β. Such automatic recording operation becomes stopped at the state γ, δ or ε.

As stated hereinbefore, the timing pulse generator 54 and the state register 40 function to generate the clear instruction PCR, read in instruction pulse CP8, and clear instruction pulse CLR. Generation of the remaining instruction pulses will now be described in greater detail with reference to the annexed Table and FIGS. 2, 3 and 9. In FIG. 3, each state R, α, β, γ ... shows that when each state is interpreted and detected, the spot in each state has been recorded and displayed and that each state is ready for the operation of the next spot.

In the state R for requesting reset, to the display coordinate X axis counter 45 and Y axis counter 47 are set the preset inputs $V_X$, $V_Y$ as shown by a curved arrow in FIG. 2, respectively, and the picture element coordinate X axis counter 61 and Y axis counter 62 are cleared, thereby determining a leading spot. The leading spot thus determined is required to be recorded and displayed on the display surface with the aid of the brightness modulating signal Z. In addition, the content of the display coordinate Y axis counter 47 is stored in the Y axis temporary memory register 50. Those instruction pulses required for these operations are shown by symbols o in the column of the state R in the annexed Table.

At the completion of the resetting operation, the state becomes α. In the case of representing one picture element by one spot, for example, the state becomes γ, the states α, β being absent.

As shown in FIG. 2, in the state α, the spot moves toward a spot which is adjacent in the Y direction, so that both the display coordinate Y axis counter 47 and the picture element coordinate Y axis counter 62 are subjected to increment, thereby determining the next spot. The next spot thus determined is recorded and displayed with the aid of the brightness modulating signal Z. The instruction pulses required for these operations are shown by symbols o in the column of the state α in the annexed Table.

Similarly, in the state β, the picture element coordinate X axis counter 61 is subjected to increment, the picture element coordinate Y axis counter 62 is cleared, while the display coordinate X axis counter 45 is subjected to increment and the content stored and held in the Y axis temporary memory register 50 is set to the display coordinate Y axis counter 47 for the purpose of flying back the wobbling scanning. For this purpose, the multiplexer 51 must be changed over. In addition, the spot must be recorded.

The states γ and δ must be divided into the states $\bar{L}\gamma$ and $L(\gamma+\delta)$ by the arrival state L of the line clock LCK.

The state $\bar{L}\gamma$ is irrelevant to synchronism and asynchronism due to the line clock LCK. The state $\bar{L}\gamma$ is similar to the state β with respect to the fact that in both the states $\bar{L}\gamma$ and β the wobbling scanning is flied back. That is, in the state $\bar{L}\gamma$, the picture element coordinate X axis counter 61 is cleared, while in the state β, the picture element coordinate X axis counter 61 is subjected to increment as described above, the other operations of the state $\bar{L}\gamma$ being the same as those of the state β.

Both the state Lγ and the state Lδ function to fly back the main scanning in synchronism with the line clock LCK. That is, in the state $L(\gamma+\delta)$, both the picture element coordinate X axis counter 61 and Y axis counter 62 are cleared, the preset value $V_X$ is set to the display coordinate X axis counter 45, and the display coordinate Y axis counter 47 is subjected to increment so as to shift the spot to the leading spot of the next scanning line. The spot located at this point must also be recorded. Those instruction pulses which are required for the above mentioned operations are shown by delta symbols Δ in the annexed Table.

The state δ functions to fly back the main scanning in asynchronism with the line clock LCK as shown by cross symbols x in the annexed Table in the same manner as the states Lγ and Lδ in which the main scanning is flied back in synchronism with the line clock LCK as shown by the delta symbols Δ in the annexed Table. These instruction pulses may be supplied through the gates by means of the state $L(\gamma+\delta)$ in synchronism with the line clock LCK or by means of the state δ in asynchronism with the line clock LCK. The switch SW shown in FIG. 9 functions to change over the state $L(\gamma+\delta)$ to the state δ and vice versa. In the case of the synchronous scanning, in the state $\bar{L}\delta$, the recording operation of the spot becomes stopped until L is set by arrival of the line clock LCK.

The state ε is the final state in which the recording operation of all of the spots has been completed. No operations inclusive of the spot recording operation are effected. As seen from the column showing the state decoder in the annexed Table, the reset must be effected in order to effect new recording and display starting from the final state ε. The reset is effected in prefernce to all of the states.

Each instruction pulse is given by the logical produced AND resulted from the multiplication together of the logical sum OR of each state shown by the symbol o, Δ or x and the timing pulse shown by the symbol ·. The brightness modulating signal Z and the light and darkness data P are the input of the logical product.

When the recording of the final spot of respective picture element, scanning line and frame has been completed, output pulses PE, LE, FE are produced with the aid of the timing pulse CP8 as shown by the symbol · in the annexed Table in respective states γ, δ, ε as shown by the symbol o in the annexed Table, respectively. These output signals PE, LE, FE may be used so as to determine the timing of the input signals RST, LCK, PCK, PEL.

In the electrical circuit shown in FIG. 9, in the case of effecting the scanning in synchronism with the line clock LCK, if the flying back is effected prior to the recording of the final spot of the picture element, the electrical circuit may be simplified in more or less extent.

As stated hereinbefore, the graphic display system according to the invention is capable of transferring any partial pattern in an input pattern and of recording and displaying the partial pattern on a display surface in the form in parallel with the original partial pattern in an enlarged scale with any desired magnification. In addition, the graphic display system according to the invention can change a longitudinal magnification independently of a transverse magnification and vice versa. As a result, the graphic display system according to the invention ensures a so-called scanning converting ability and provides the important advantage that a pattern having any desired scanning line density can be recorded and displayed without producing any strain. In addition, the graphic display system according to the invention may be applied not only to the raster scanning system but also to a random scanning system by repeating reset function.

The graphic display system according to the invention is applicable to a cathode ray tube display device, various kinds of printers such as an ink-jet printer, etc. and a facsimile recording device.

What is claimed is:

1. A graphic display system for raster scanning comprising means for extracting a given partial pattern from an original pattern and having means for comparing a counted value of an input coordinate X axis counter for counting the number of picture elements of the original pattern at every scanning line with given preset values so as to select a picture element having an X coordinate value within a given range of input coordinates and comparing a counted value of an input coordinate Y axis counter for counting the number of scanning lines of the original pattern with given preset values so as to select a picture element having a Y coordinate value within the given range of the input coordinates;

means for presetting given values to a display coordinate X axis counter and to a display coordinate Y axis counter, respectively, so as to bring a leading picture element of said partial pattern extracted from said original pattern into correspondence with given coordinates of display coordinates;

means for incrementing contents of said display coordinate X axis counter so as to determine a coordinate position of a picture element to be recorded next to a recorded picture element in correspondence with recording and display of each picture element and resetting said display coordinate X axis counter and subjecting contents of said display coordinate Y axis counter to increment when the contents of said display coordinate X axis counter exceed said given value; and means for stopping recording and display when the contents of both said display coordinate X axis counter and said display coordinate Y axis counter reach to respective given present values so as to control the recording of said partial pattern said picture element being comprised of a plurality of spots, the number of said spots being preset so that the size of a picture element is made variable and the magnification of the display may be varied, selected portions of the input picture image being removable and the resultant picture image being displayable on a selected portion of the display surface.

2. The display device according to claim 1, wherein said display coordinate X axis counter is reset and said display coordinate Y axis counter is subjected to increment by detecting the final scanning line of said partial pattern extracted from said original pattern or by detecting the next leading scanning line.

3. A display system for raster scanning comprising:

means for resetting a picture element coordinate X axis counter and Y axis counter, respectively, so as to bring a leading spot in a leading picture element of a partial picture element extracted from an original pattern into correspondence with a given coordinate of display coordinates and storing contents of a display coordinate Y axis counter in a Y axis temporary memory register after a display coordinate counter and said display coordinate Y axis counter have been preset to respective given preset values;

means for subjecting both the contents of said picture element coordinate Y axis counter and said display coordinate Y axis counter to increment so as to determine a coordinate position of a spot to be recorded next to a recorded picture element in correspondence with recording and display of each picture element, resetting said picture element coordinate Y axis counter and subjecting contents of said picture element coordinate X axis counter of increment when the contents of said picture element coordinate Y axis counter reach to said given value, and setting the contents of said Y axis counter;

means for resetting said picture element coordinate axis counter and Y axis counter when the contents of said picture element coordinate X axis counter and Y axis counter reach to respective given values, subjecting said display X axis counter to increment, and setting the content of said Y axis temporary memory register to said display coordinate Y axis counter;

means for resetting both said picture element coordinate X axis counter and said element coordinate Y axis counter when the contents of said display coordinate X axis counter exceed said given value, resetting said display coordinate X axis counter to the same value as said preset value, and subjecting said display coordinate Y axis counter to increment; and means for stopping recording and display when the contents of both said display coordinate X axis counter and said display coordinate Y axis counter exceed respective given preset values so as to control the recording of said partial pattern extracted from said original pattern whereby one picture element is recorded and displaced by spots arranged in plurality of matrixes said picture element being comprised of a plurality of spots, the number of said spots being preset so that the size of a picture element is made variable and the magnification of the display may be varied, selected portions of the input picture image being removable and the resultant picture image being displayable on a selected portion of the display surface.

4. A display system for raster scanning as defined in claim 3, wherein said raster scanning involves wobbling, the pattern being recorded on information storage means, a picture element having a programmable number of spots, said spots being independently specified in longitudinal and transverse directions, magnification of said partial pattern being variable independently in longitudinal and transverse directions, any portion from said original pattern being extractable, the partial pattern thus extracted being displayable on a display surface as an output at any position of said display surface at any longitudinal and transverse magnification.

5. The display device according to claim 3, wherein both said picture element coordinate X axis counter and said picture element coordinate Y axis counter are reset, said display coordinate X axis counter is reset to the same value as said preset value, and said display coordinate Y axis counter is subjected to increment by detecting the final scanning line of said partial pattern extracted from said original pattern or by detecting the next leading scanning line.

6. The display system according to claim 3, wherein when the content of said display coordinate X axis counter exceeds said given value and the contents of both said picture element coordinate X axis counter and said picture element coordinate Y axis counter reach to respective given values, said picture element coordinate X axis counter and Y axis counter are reset, said display coordinate X axis counter is reset to the same value as said preset value, and said display coordinate Y axis counter is subjected to increment; and when the contents of both said display coordinate X axis counter and said display coordinate Y axis counter exceed respective given preset values and the contents of both said picture element coordinate X axis counter and said picture element coordinate Y axis counter reach to respective given values, recording and display are stopped so as to control the recording of said partial pattern extracted from said original pattern.

7. The display system according to claim 3, wherein when the final scanning line of said partial pattern extracted from said original pattern or the next leading scanning line is detected and the contents of both said picture element coordinate X axis counter and said picture element coordinate Y axis counter reach to respective given values, both said picture element coordinate X axis counter and said picture element coordinate Y axis counter are reset, said display coordinate X axis counter is reset to the same value as said preset value, and said display coordinate Y axis counter is subjected to increment; and when the contents of both said display coordinate X axis counter and said display coordinate Y axis counter exceed respective given preset values and the contents of both said picture element coordinate X axis counter and said picture element coordinate Y axis counter reach to respective given values, recording and display are stopped so as to control the recording of said partial pattern extracted from said original pattern.

* * * * *